(12) United States Patent
Faerber

(10) Patent No.: US 9,016,996 B2
(45) Date of Patent: Apr. 28, 2015

(54) THREADED SLEEVES

(75) Inventor: Wolfgang Faerber, Schwarzenbek (DE)

(73) Assignee: RAMPA Verbindungstechnik GmbH & Co. KG, Schwarzenbek (DE)

( * ) Notice: Subject to any disclaimer, the term of this patent is extended or adjusted under 35 U.S.C. 154(b) by 337 days.

(21) Appl. No.: 13/415,060

(22) Filed: Mar. 8, 2012

(65) Prior Publication Data

US 2012/0237317 A1     Sep. 20, 2012

(30) Foreign Application Priority Data

Mar. 9, 2011   (DE) .................. 10 2011 001 176

(51) Int. Cl.
 F16B 35/04       (2006.01)
 F16B 25/00       (2006.01)
 F16B 37/12       (2006.01)
(52) U.S. Cl.
 CPC .......... F16B 25/0015 (2013.01); F16B 25/0047 (2013.01); F16B 37/127 (2013.01)
(58) Field of Classification Search
 USPC ......................................... 411/178, 395, 423
 See application file for complete search history.

(56) References Cited

U.S. PATENT DOCUMENTS

| 2,742,074 | A | * | 4/1956 | Rosan ........................... 411/109 |
| 3,707,107 | A |   | 12/1972 | Bieri |
| 4,097,061 | A | * | 6/1978 | Dietlein ........................ 280/607 |
| 6,113,331 | A | * | 9/2000 | Grossberndt et al. ......... 411/411 |
| 6,158,939 | A | * | 12/2000 | Grossberndt et al. ......... 411/411 |
| 6,702,537 | B2 | * | 3/2004 | Neuhengen ................... 411/414 |
| 6,722,833 | B2 | * | 4/2004 | Birkelbach ................... 411/411 |
| 6,846,142 | B2 | * | 1/2005 | Gens ............................. 411/411 |
| 7,658,581 | B2 |   | 2/2010 | Sussenbach |

FOREIGN PATENT DOCUMENTS

| AT | 336354 B | 5/1977 |
| DE | 2102910 C3 | 8/1971 |
| DE | 29814010 U1 | 10/1998 |
| DE | 102004021484 A1 | 11/2005 |
| DE | 202007004876 U1 | 6/2007 |
| EP | 1574725 A1 | 9/2005 |

* cited by examiner

*Primary Examiner* — Gary Estremsky
(74) *Attorney, Agent, or Firm* — Kelly & Kelley, LLP

(57) ABSTRACT

A threaded metal sleeve includes a core and a thread provided on the outside of the core, with the thread profile having a flank angle within the range from 25° to 35°. The pitch (h) of the thread is 0.1-fold to 0.4-fold of the outer diameter of the threaded sleeve, and the thread depth of the thread is 0.02-fold to 0.2-fold of the outer diameter of the threaded sleeve.

15 Claims, 1 Drawing Sheet

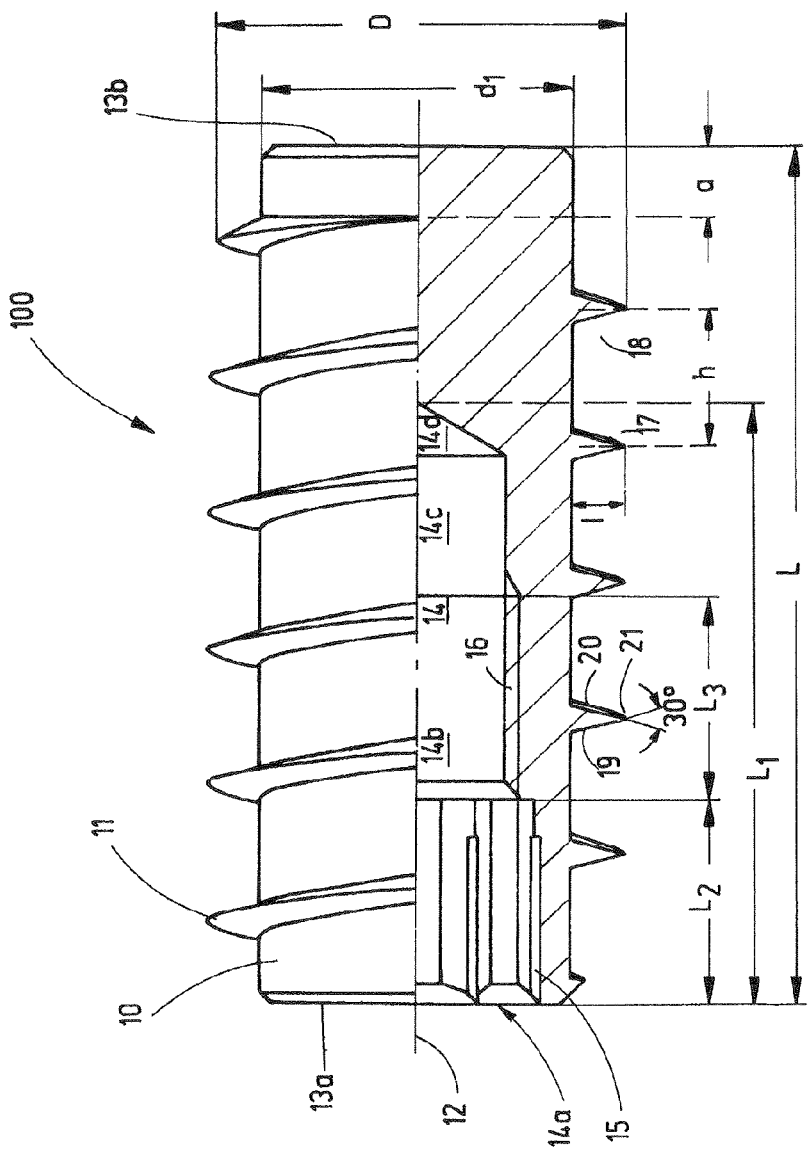
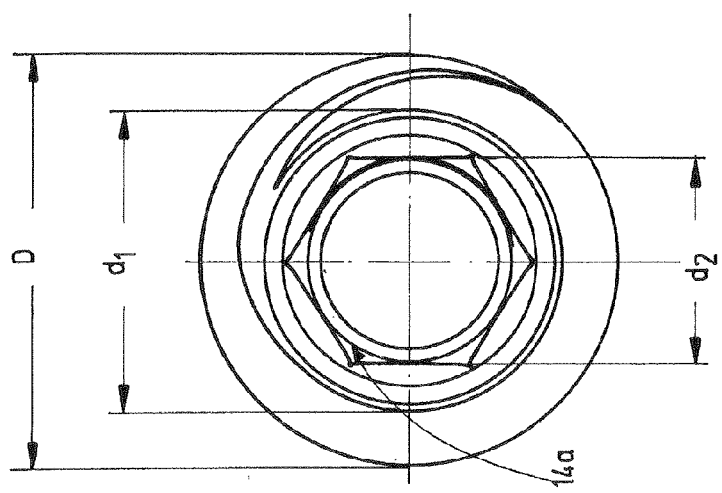

THREADED SLEEVES

The invention relates to a threaded sleeve made of metal for screwing into a receiving opening of a work piece.

Such threaded sleeves are also called bushings or threaded bushes. They comprise a core and a thread provided on the outer surface of the core. The receiving opening of the work piece into which the threaded sleeve is to be screwed can, for instance, be a boring. The receiving opening does normally not have an own thread.

Threaded sleeves normally have a hollow space within which an internal thread for receiving a complementary connecting element, for instance a screw, is provided. Thus, the threaded sleeve itself is no screw. The hollow space can extend along the entire length of the threaded sleeve or only project into the same from the front side end of the threaded sleeve. An internal thread can be formed in the inner wall of the threaded sleeve which can extend along the entire hollow space or only along a part of the same.

With the threaded sleeves which are known from the state of the art problems arise when the same are screwed into receiving openings of work pieces, in particular when the work pieces are made of wood. Cracks may occur within the material of the work piece. In most cases the reason for this is that, due to the configuration of the thread of the threaded sleeve, the work piece material is deformed. This deformation creates tensions which are so strong that the work piece material ruptures or exits from the receiving opening, thus preventing a flush assembly. Moreover, the material may heat up during the screw-in process and break off when the stress gets too high.

It is the object of the present invention to provide a threaded sleeve where, after the screwing-in, a sufficient tensile strength of the connection between the threaded sleeve and the material is ensured but where, during the screwing-in, no damage is caused at the work piece and/or the same is reduced. The above-mentioned object is accomplished by means of a threaded sleeve with the features set out in claim 1.

The threaded sleeve is normally integrally made of metal. By means of the screwing-in, i.e. by a rotation around the longitudinal axis of the threaded sleeve, the threaded sleeve is inserted into the receiving opening of a work piece. When screwed into a receiving opening, the thread of the threaded sleeve creates a thread and/or a counter-thread in the (smooth-walled) surface of the receiving opening. As a general rule and depending upon the thread profile of the threaded sleeve, the thread and/or the counter-thread is created in the wall of the receiving opening by the displacement or cutting of the work piece material.

In the present invention, the creation of the thread in the smooth-walled surface of the receiving opening is accomplished by a particularly efficient cutting. The thread profile of the threaded sleeve has a very small flank angle within the range from 25° to 35°. The thread profile is the cross-sectional outline of the thread and/or of the thread turn. The flank angle is the angle included by the sides which form the thread profile. By choosing a smaller flank angle, a better cutting effect for cutting into the wall of a receiving opening is achieved resulting in a lower torque which is required when the threaded sleeve is screwed in. The thread of the threaded sleeve does not displace, compress or compact the material of the work piece but cuts it, wherein an adequate stability of the flank angle must be ensured so that the required tensile strength is maintained. Consequently, a breaking of the work piece occurs less often, and the thermal heating-up of the material, as happens in particular in wood, is substantially reduced. In addition, owing to the better cutting process, the material of the work piece into which the threaded sleeve is screwed is damaged less, as is for instance the case with the formation of small cracks which later on result in a bad connection between the threaded sleeve and the material. Thus, all in all, a substantially increased tensile strength of the connection is brought about.

Furthermore, the inventive threaded sleeve has a comparatively great pitch of thread. Pitch of thread means the distance in parallel with the longitudinal axis between the centres of two adjacent thread turn sections. In single threads, the pitch of thread corresponds to the lead of the thread which is the distance by which a threaded sleeve is screwed into a material during one turn of 360°.

A great pitch of thread is advantageous in particular for screwing into wood since less wood fibres are damaged and a stronger connection is achieved. Nevertheless, the pitch of thread must not be too great since otherwise the tensile strength decreases again. The inventive threaded sleeve overcomes this contradiction by means of a pitch of thread with the 0.1-fold to 0.4-fold of the outer diameter of the threaded sleeve.

Also in respect of the thread depth, the threaded sleeve according to the invention finds a compromise between an increase in the tensile strength of the connection between the threaded sleeve and the work piece by means of a particularly great thread depth and the damage which is simultaneously caused to the material. Here, the thread depth is the difference between the outer diameter of the threaded sleeve which includes the thread and the outer diameter of the core (without the external thread). In other words, the thread depth is the height of the thread profile. According to the present invention, the thread depth is the 0.02-fold to 0.2-fold of the outer diameter of the threaded sleeve.

In a preferred embodiment of the inventive threaded sleeve, the thread profile of the threaded sleeve has no curvature, in particular within the area of the thread profile that is spaced most from the core. Consequently, the profile of the thread is no round thread and does not have, in general, a radius of curvature in any region. Thereby, a particularly good cutting effect of the threaded sleeve is achieved.

Furthermore, the thread profile in a preferred embodiment has a substantially pointed configuration. This means that the sides of the thread substantially form a tip in the point of the thread profile that is spaced most from the core. During the manufacturing process, a thread profile with a perfect tip cannot always be ensured. Between the ends of the sides of the thread which face away from the core of the threaded sleeve, an elevated plane can be created which runs substantially in parallel to the core of the threaded sleeve. This elevated plane should, however, maximally have only 10%, preferably maximally 5%, of the distance which the sides include between their ends facing towards the core in order to provide for a substantially pointed profile.

Moreover, it is preferred that the flank angle is constant along the entire thread depth. This is the case when the sides of the thread have neither kinks nor curves in the thread profile but can be described by a straight line each with a constant slope.

As a general rule, the threaded sleeve can be used for screwing into the receiving opening of a work piece of any kind. In a preferred embodiment the inventive threaded sleeve is, however, designed for screwing into a work piece made of wood so that the threaded sleeve and the wooden work piece constitute a joint system. It is particularly advantageous that the inventive threaded sleeve does not compact or compress the wood and/or the cell structure of the wood but only cuts the wood instead. This results in a considerably increased tensile strength between the threaded sleeve and the wooden work piece. This effect is further enhanced by the structure of the wood. As a general rule, wood has a tensile strength that is greater in the longitudinal direction of the annual rings than in the transverse direction because the different annual rings have different properties of the material and since often connections with a lower degree of stressability exist between individual annual rings. If the wood and/or its cell structure is compressed and thus destroyed due to the insertion of a threaded sleeve, the cohesion between the individual annual rings is further reduced and the tensile strength between the threaded sleeve and the work piece of wood decreases.

Preferably, the flank angle is 28° to 32°, particularly preferred 29° to 31°, and still more preferred exactly 30°.

Preferably, the pitch of thread is the 0.15-fold to 0.35-fold and particularly preferred the 0.16-fold to 0.33-fold of the outer diameter of the threaded sleeve.

Moreover, the preferred thread depth of the thread is the 0.04-fold to 0.18-fold and particularly preferred the 0.06-fold to 0.16-fold of the outer diameter of the threaded sleeve.

It has become evident that, above all with the above-mentioned particularly preferred ranges, an extremely good tensile strength of the connection between the threaded sleeve and the work piece can be attained.

In another preferred embodiment the core of the threaded sleeve substantially has a constant diameter throughout. Here, both the outer diameter and the inner diameter of the core, which is at the same time the diameter of the hollow space of the core (screw receiving opening), can be constant throughout.

A particularly preferred configuration is the inventive threaded sleeve made of steel, brass or die-cast zinc.

A preferred embodiment of the invention is shown in the figures which schematically show:

FIG. 1: a side view and a longitudinal section of an inventive threaded sleeve, and FIG. 2: a top view of a threaded sleeve of FIG. 1.

FIG. 1 shows an inventive threaded sleeve 100 of a length L which comprises a cylindrical core 10 and a single-thread thread 11 provided outside on the core 10. The lower half of FIG. 1 shows a length along the longitudinal axis 12 of the threaded sleeve 100 while a side view of the threaded sleeve 100 is shown in the upper half.

In the upper half of the figure it can be seen how the thread turn of the single-thread thread 11 helically winds around the core 10 from the one end 13a to the other end 13b of the threaded sleeve 100 with the area along length a at the end 13b of the threaded sleeve 100 being left out. This thread-free area along length a is used for the insertion of the threaded sleeve 100 into a receiving opening (not shown here) into which the threaded sleeve 100 is screwed. Furthermore, it can be seen that the threaded sleeve 100 conically tapers at its two ends 13a, 13b.

The lower half of the figure shows that the illustrated threaded sleeve 100 has a cylindrical hollow space 14 which projects from end 13a of threaded sleeve 100 by length L1 into the threaded sleeve 100. The hollow space 14 has four sub-areas 14a, 14b, 14c, 14d which directly follow each other in the longitudinal direction of threaded sleeve 100. In this embodiment, length L1 covers at least half of the length L of the threaded sleeve 100. Along length L2 the hollow space 14 is designed as a receiving area 14a for a tool for the screwing-in of the threaded sleeve 100. In the receiving area 14a notches 15 in parallel to the longitudinal axis are worked into the inner wall of core 10 into which the tool can grip. In this embodiment, the receiving area 14a serves for holding a special hexagon socket screw key (not shown here).

Along the lengths L2 and L3 the threaded sleeve 100 from FIG. 1 is provided with an internal thread 16 for the screwing-in of another connecting element (not shown here), for instance of a screw. Through the provision of the receiving area 14a with the notches 15, the internal thread 16 was in part reduced within the area L2. Within the area 14b along length L3 the internal thread 16 is unreduced. In FIG. 1, the unreduced internal thread 16 is not illustrated by a profile like the externally provided thread 11 but by the boundary of a parallelogram with L3 as the long side and the thread depth of the internal thread 16 as the short side. In the area 14c of the hollow space 14 of threaded sleeve 100 no internal thread 16 is provided so that the hollow space has in this area 14c a different, i.e. smaller diameter than in the area 14b. In the area 14d the hollow space conically tapers within the threaded sleeve 100 to form a tip. The longitudinal section in FIG. 1 shows the thread profile with its characteristic parameters. The thread depth I as the difference of the outer diameter D of the threaded sleeve and the outer diameter d1 of the core is given by length L. The pitch of thread h indicates the distance in parallel to the longitudinal axis between the centres of two adjacent thread turn sections, here for instance between the thread turn sections 17, 18.

In this embodiment, the two illustrated sides 19, 20 of the thread profile form an isosceles triangle with the flank angle being 30°. Area 21 of the thread profile which is spaced most from core 10 is formed as a tip by the throughout straight-lined form of sides 19, 20.

FIG. 2 shows a top view of end 13a of the inventive threaded sleeve 100 from FIG. 1. One recognises the hexagonal receiving area 14a from FIG. 1 for a special hexagon socket screw key (not shown here). While the threaded sleeve 100 has an outer diameter D, the core 10 of the threaded sleeve 100 has an outer diameter d1. The internal thread of threaded sleeve 100 has the outer diameter d2.

In a preferred embodiment, the inventive threaded sleeves comprise an outer diameter D from 6 mm to 30 mm with a pitch of thread h between 2 mm and 5 mm and a thread depth I between 0.75 mm and 2 mm.

Particularly preferred are the following combinations of the features of the thread profile:

| | | |
|---|---|---|
| at D = 6 mm: | h = 2 mm | I = 0.75 mm |
| at D = 8 mm: | h = 2 mm | I = 1.25 mm |
| at D = 10-16 mm: | h = 3 mm | I = 1.25 mm |
| at D = 18.5-22 mm: | h = 4 mm | I = 1.5 mm |
| at D = 25-30 mm: | h = 5 mm | I = 2 mm |

The invention claimed is:

1. A threaded sleeve made of metal for screwing into a receiving opening of a work piece, comprising:
   a core and a thread provided on the outside of the core;
   wherein the thread has a thread profile having a flank angle within the range from 25° to 35°;
   wherein a pitch (h) of the thread is 0.1-fold to 0.4-fold of the outer diameter (D) of the threaded sleeve;
   wherein a thread depth (I) of the thread is 0.02-fold to 0.2-fold of the outer diameter (D) of the threaded sleeve; and
   wherein the thread profile has a crest flat having maximally 10% of the thickness of the thread profile at its root.

2. A threaded sleeve according to claim 1, wherein the thread profile has no curvature.

3. A threaded sleeve according to claim 1, wherein the thread profile has a substantially pointed configuration.

4. A threaded sleeve according to claim 1, wherein the flank angle is constant along the entire thread depth (I).

5. A threaded sleeve according to claim 1, wherein the threaded sleeve is configured for being screwed into a work piece made of wood.

6. A threaded sleeve according to claim 1, wherein the flank angle of the thread profile is 28° to 32°.

7. A threaded sleeve according to claim 1, wherein the pitch (h) of the thread is 0.15-fold to 0.35-fold of the outer diameter (D) of the threaded sleeve.

8. A threaded sleeve according to claim 1, wherein the thread depth (I) of the thread is 0.04-fold to 0.18-fold of the outer diameter (D) of threaded sleeve.

9. A threaded sleeve according to any one of the preceding claims, wherein the core of the threaded sleeve has a constant diameter (d1).

10. A threaded sleeve according to any one of claims 1-8, wherein the threaded sleeve is made of steel, brass or die-cast zinc.

11. A threaded sleeve according to claim 6, wherein the flank angle of the thread profile is 29° to 31°.

12. A threaded sleeve according to claim 11, wherein the flank angle of the thread profile is 30°.

13. A threaded sleeve according to claim 7, wherein the pitch (h) of the thread is 0.16-fold to 0.33-fold of the outer diameter (D) of the threaded sleeve.

14. A threaded sleeve according to claim 8, wherein the thread depth (I) of the thread is 0.06-fold to 0.16-fold of the outer diameter (D) of the threaded sleeve.

15. A threaded sleeve according to claim 2, wherein the thread profile has no curvature in an area of the thread profile facing away from the core.

\* \* \* \* \*